（12） United States Patent
Krainz et al.

(10) Patent No.: US 8,683,017 B2
(45) Date of Patent: Mar. 25, 2014

(54) WEB-BASED CONFIGURATION OF DISTRIBUTED AUTOMATION SYSTEMS

(75) Inventors: Michael Krainz, Perchtoldsdorf (AT); Alois Zoitl, Rohrbach (AT); Franz Johann Auinger, St. Pantaleon (AT); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1045 days.

(21) Appl. No.: 11/536,898

(22) Filed: Sep. 29, 2006

(65) Prior Publication Data
US 2008/0082637 A1    Apr. 3, 2008

(51) Int. Cl.
*G06F 15/177*    (2006.01)
(52) U.S. Cl.
USPC ......................................................... 709/220
(58) Field of Classification Search
CPC .............. H04I 41/0253; H04I 41/0813; H04I 41/0853; H04I 41/22
USPC ......................................................... 709/220
See application file for complete search history.

(56) References Cited

U.S. PATENT DOCUMENTS

| | | | |
|---|---|---|---|
| 6,061,603 A | 5/2000 | Papadopoulos et al. | |
| 6,201,996 B1 | 3/2001 | Crater et al. | |
| 6,434,737 B1 | 8/2002 | Nishi | |
| 6,477,435 B1 * | 11/2002 | Ryan et al. | 700/86 |
| 6,865,429 B1 | 3/2005 | Schneider | |
| 7,017,116 B2 | 3/2006 | Elsbree et al. | |
| 7,035,898 B1 | 4/2006 | Baker | |
| 7,054,922 B2 | 5/2006 | Kinney et al. | |
| 7,085,841 B2 | 8/2006 | Edwards et al. | |
| 7,165,226 B2 | 1/2007 | Thurner | |
| 7,290,030 B2 | 10/2007 | Edwards | |
| 7,324,856 B1 | 1/2008 | Bromley | |

(Continued)

FOREIGN PATENT DOCUMENTS

| | | | |
|---|---|---|---|
| JP | 2004102586 A | 4/2004 | |
| WO | 9853581 A | 11/1998 | |

(Continued)

OTHER PUBLICATIONS

T. Lump, et al., "Virtual Java devices. Integration of fieldbus based systems in the Internet" Industrial Electronics Society, 1998. IECON '98. Proceedings of the 24th Annual Conference of the IEEE Aachen, Germany Aug. 31-Sep. 4, 1998, New York, NY, USA, IEEE, US, vol. 1, Aug. 31, 1998, pp. 176-181.
European Search Report dated Feb. 27, 2008 for European Patent Application Serial No. EP 07 11 5135, 1 Page.
Lewis. "Modeling Control Systems Using IEC 61499" The Institute of Electrical Engineers, London 1998.
Tanenbaum, et al. "Distributed Systems. Principles and Paradigms" Second Ed. Pearson Prentice Hall, Upper Saddle River, New Jersey, 2007.

(Continued)

*Primary Examiner* — David X Yi
(74) *Attorney, Agent, or Firm* — Amin, Turocy & Watson, LLP

(57) ABSTRACT

A configuration tool provides a user interface that interacts with a gateway to remotely configure and/or monitor automation devices in an automation network. The configuration tool employs a self-contained software application (e.g., applet) that can be utilized for presentation and configuration interactions within a common web browser. The configuration tool can be based on open standards and implemented with small devices and/or with heterogeneous automation networks. The configuration tool can provide a list of automation devices to a system engineer via a workstation and standard software (e.g., a PC with a browser). The configuration tool interacts with automation devices to obtain their configurable parameters and/or send configuration commands. In one instance, the configuration tool and the automation network devices are based on Java and IEC 61499, respectively.

17 Claims, 15 Drawing Sheets

(56) References Cited

U.S. PATENT DOCUMENTS

| | | | |
|---|---|---|---|
| 7,418,300 | B2 | 8/2008 | Gikas et al. |
| 7,555,706 | B2 | 6/2009 | Chapman et al. |
| 2001/0034852 | A1 | 10/2001 | Kawashima |
| 2002/0152289 | A1* | 10/2002 | Dube .......................... 709/220 |
| 2003/0051074 | A1 | 3/2003 | Edwards |
| 2003/0084201 | A1 | 5/2003 | Edwards et al. |
| 2003/0093460 | A1 | 5/2003 | Kinney et al. |
| 2003/0105535 | A1* | 6/2003 | Rammler ....................... 700/17 |
| 2004/0210664 | A1* | 10/2004 | Prendergast ................. 709/230 |
| 2005/0043620 | A1 | 2/2005 | Fallows et al. |
| 2005/0155043 | A1 | 7/2005 | Schulz et al. |
| 2006/0190112 | A1 | 8/2006 | Buesgen |
| 2006/0209868 | A1 | 9/2006 | Callaghan |
| 2007/0168060 | A1 | 7/2007 | Nixon et al. |
| 2007/0179641 | A1* | 8/2007 | Lucas et al. .................... 700/83 |
| 2008/0080543 | A1 | 4/2008 | Hickox et al. |

FOREIGN PATENT DOCUMENTS

| | | | |
|---|---|---|---|
| WO | 9853581 | A1 | 11/1998 |
| WO | 0195041 | | 12/2001 |
| WO | 03079126 | A | 9/2003 |
| WO | 2004086160 | | 10/2004 |

OTHER PUBLICATIONS

OA mailed Mar. 17, 2009 for U.S. Appl. No. 11/427,436, 21 pages.
OA mailed Mar. 25, 2009 for U.S. Appl. No. 11/427,423, 25 pages.
Thramboulidis, et al. "An Architecture for the Development of Function Block Oriented Engineering Support Systems" (2001) IEEE International Symposium on Computational Intelligence in Robotics and Automation, 10 pages.
Thramboulidis, et al. "Field Device Specification for the Development of Function Block Oriented Engineering Support Systems" (2001) IEEE Conference on Emerging Technology and Factory Automation, 7 pages.
Thramboulidis, et al. "Using UML for the Development of Distributed Industrial Process Measurement and Control Systems" (2001) IEEE International Conference on Control Applications, 6 pages.
Thramboulidis, et al. "Developing a CASE tool for Distributed Control Control Applications" (2004) International Journal of Advanced Manufacturing Technology, 12 pages.
Thramboulidis, et al. "Development of Distributed Industrial Control Applications: The CORFU Framework" (2002) 4th IEEE International Workshop on Factory Communication Systems, 8 pages.
Thramboulidis, et al. "An IEC-compliant Engineering Tool for Distributed Control Applications, A White Paper" (2003) Electrical & Computer Engineering, 6 pages.
WEC the World Wide Web Consortium Hyper Text Markup Language (HTML) Home Page http://www.w3c.org/MarkUp/ last viewed Nov. 6, 2006, 15 pages.
WEC the World Wide Web Consortium HTTP—Hyper Text Transfer Protocol http://www.w3c.org/Protocols/#Specs last viewed Nov. 6, 2006, 63 pages.
Net Beans: Main Page NetBeans IDE 3.6 (4.0) http://www.netbeans.org last viewed Nov. 6, 2006, 4 pages.
Net Beans: Documentation and Support http://netbeans.org/kb/index.html last viewed Nov. 6, 2006, 2 pages.
Net Beans: Getting Started with the NetBeans Open APIs http://openide.netbeans.org/source/browse/checkout/openide/api/doc/tutorial/index.html last viewed Nov. 6, 2006, 1 page.
Net Beans: The Definitive Guide http://netbeans.org/kb/index.html last viewed Nov. 6, 2006, 2 pages.
Eclipse Corner: Eclipse Main Page; Eclipse SDK 3.0 http://www.eclipse.org last viewed on Nov. 6, 2006, 2 pages.
Eclipse Corner: Technical Articles http://www.eclipse.org/articles/index.html last viewed Nov. 6, 2006, 2 pages.
Sun Microsystems Java http://www.java.sun.com last viewed Nov. 3, 2006, 2 pages.
WEBIEC International Electrotechnical Comission IEC 61499 http://java.sun.com/docs/books/tutorial/jar/index,html last viewed Nov. 6, 2006, 61 pages.
Ernestus. "Mit Webstandards bis an die Klemme" IEEE (2003) Huthig, Heidelberg, 14 pages.
IDS Group. "IDA White Paper v1.0, Interface for Distributed Automation" (2001) IDS Group pp. 515-518.
HMSC "The Holonic Manufacturing Systems Consortium" IEC 61499 Compliance Profile for Feasibility Demonstrations http://www.holobloc.com/doc/ita/index.htm last viewed Nov. 6, 2006, 1 page.
Sun. The Source for Developers. The Java 1.4.2 API Specification http://java.sun.com.j2se/1.4.2/docs/api/ last viewed Nov. 6, 2006, 10 pages.
Fernig, et al. "Towards Distributed Configuration" (2001) Joint German/Austrian Conference on AI, vol. 2174, 15 pages.
Graupner, et al. "Configuration, Simulation and Animation of Manufacturing Systems via the Internet" (2002) Proceedings of the Simulation Conference, 7 pages.
OA Dated Oct. 15, 2008 for U.S. Appl. No. 11/427,423, 18 pages.
OA Dated Sep. 10, 2008 for U.S. Appl. No. 11/427,436, 18 pages.
OA Dated May 22, 2009 for U.S. Appl. No. 11/536,878, 46 pages.
OA dated Aug. 26, 2009 for U.S. Appl. No. 11/427,423, 36 pages.
OA dated Jul. 24, 2009 for U.S. Appl. No. 11/427,436, 26 pages.
OA dated Mar. 26, 2010 for U.S. Appl. No. 11/427,423, 30 pages.
OA dated Apr. 7, 2010 for U.S. Appl. No. 11/427,436, 29 pages.
OA dated Nov. 16, 2009 for U.S. Appl. No. 11/536,878, 44 pages.
European Search Report dated Dec. 27, 2007 for European Application No. 07012540.6, 6 pages.
OA dated Aug. 25, 2010 for U.S. Appl. No. 11/427,423, 41 pages.
OA dated Jul. 14, 2010 for U.S. Appl. No. 11/536,878, 57 pages.
OA dated Oct. 6, 2010 for U.S. Appl. No. 11/427,436, 29 pages.
OA dated Dec. 27, 2010 for U.S. Appl. No. 11/536,878, 67 pages.
EP Search Report dated Oct. 22, 2010 for European Application No. 07115098.1-2206 / 1906274, 8 pages.
Thramboulidis, et al., An Architecture for the Development of Function Block Oriented Engineering Support Systems. Proceedings of 2001 International Symposium on Computational Intelligence in Robotics and Automation. Jan. 1, 2001, XP002603549. URL: http://ieeexplore.ieee.org/xpls/abs_all.jsp?arnumber=1013258&tag=1. Last accessed Nov. 2, 2010, 8 pages.
OA dated Apr. 1, 2011 for U.S. Appl. No. 11/427,436, 38 pages.
Hummer, et al., "Development of an Extensible Engineering Support Tool for IEC 61499 Considering WYSIWYG GUI Building as Example". 10th IEEE International Conference on Emerging Technologies and Factory Automation, IEEE, Piscataway, NJ, USA, vol. 2 Sep. 19, 2005, pp. 607-613, XP010905536, DOI: 10.1109/ETFA.2005.1612731, ISBN: 978-0-9401-8. Retrieved on Sep. 18, 2013, 8 pages.
Christensen, et al., "OOONEIDA: An Open, Object-Oriented Knowledge Economy for Intelligent Industrial Automation", IEEE Transactions on industrial informatics, IEEE Service Center, New York, NY, US vol. 1, No. 1, Feb. 1, 2005 pp. 4-17, XP011128763, ISSN: 1551-3203, DOI: 10.1109/TII.2005,843829. Retrieved on Sep. 18, 2013, 14 pages.
Schwab, et al., "The Modular Torero IEC 61499 Engineering Platform—Eclipse in Automation", 10th IEEE International Conference on Emerging Technologies and Factory Automation, IEEE, Piscataway, NJ, USA, vol. 2, Sep. 19, 2005, pp. 265-272, XP010905494, DOI: 10.1109/ETFA.2005.1612689, ISBN: 978-0-7803-9401-8. Retrieved on Sep. 18, 2013, 8 pages.
Xinjun, et al, "Design and implementation of a prototype control system according to IEC 61499". Emerging Technologies and Factory Automation, 2003. Proceedings of ETFA '03 IEEE Conference Sep. 16-19, 2003, Piscataway, NJ, USA, IEEE, vol. 2, Sep. 16, 2003, pp. 269-276, XP010671314, ISBN: 978-0-7803-7937-4. Retrieved on Sep. 18, 2013, 8 pages.
European Search Report dated Sep. 6, 2013 for European Application No. 07012541.4-1954/1873634, 12 pages.

* cited by examiner

WEB-BASED CONFIGURATION OF DISTRIBUTED AUTOMATION SYSTEMS

RELATED APPLICATIONS

This application is related to co-pending and co-assigned U.S. applications entitled "HMI FRAMEWORK FOR EXTENSIBLE AUTOMATION SYSTEM ENGINEERING PLATFORMS," client reference 06AB124, filed on Jun. 29, 2006 and assigned Ser. No. 11/427,423; "WEB-BASED CONFIGURATION SERVER FOR AUTOMATION SYSTEMS," client reference 06AB125, filed on Sep. 29, 2006 and assigned Ser. No. 11/536,878; and "AUTOMATION HMI VISUALIZATION UTILIZING GUI FUNCTION BLOCK," client reference 06AB126, filed on Jun. 29, 2006 and assigned Ser. No. 11/427,436 and are incorporated herein by reference.

BACKGROUND

Modern automation typically consists of distributed systems that are often quite complex. This creates an additional burden on system engineers who must change production processes to meet ever changing manufacturing guidelines. These changing guidelines are frequently caused by rapid changes in markets that make great demands on the flexibility of the manufacturing systems. In these situations, progressive automation helps to further improve productivity, while preserving reliability and product quality. But the automation evolution continuously requires more logic and processing capabilities from production lines. The control systems, therefore, must also continuously grow in size and complexity. To keep the designs flexible and manageable, the intelligence is often distributed into so-called smart devices, for example, directly into sensors and actuators.

Distributed systems allow controlling algorithms to be split into ever smaller and simpler parts, with components that can be inexpensively reused for other tasks. Sensor data can now be processed within the smart devices themselves instead of transferring it to a central controlling unit. This may also help reduce real-time communications between the automation devices, allowing further advancements in the automation processes. But, the ever increasing complexity of distributed automation also increases the level of sophistication required to configure the processes, often beyond the capabilities of lesser skilled operators and requiring complex and expensive control software.

SUMMARY

A configuration tool provides a user interface that interacts with a gateway to remotely configure and/or monitor automation devices in an automation network. The configuration tool employs a self-contained software application (e.g., applet) that can be utilized for presentation and configuration interactions within a common web browser. The configuration tool can be based on open standards and implemented for small devices and/or for heterogeneous automation networks. The configuration tool can provide a list of automation devices to a system engineer via a workstation and standard software (e.g., a PC with a browser). The configuration tool interacts with automation devices to obtain their configurable parameters and/or send configuration commands. In one instance, the configuration tool and the automation network devices are based on Java and IEC 61499, respectively.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
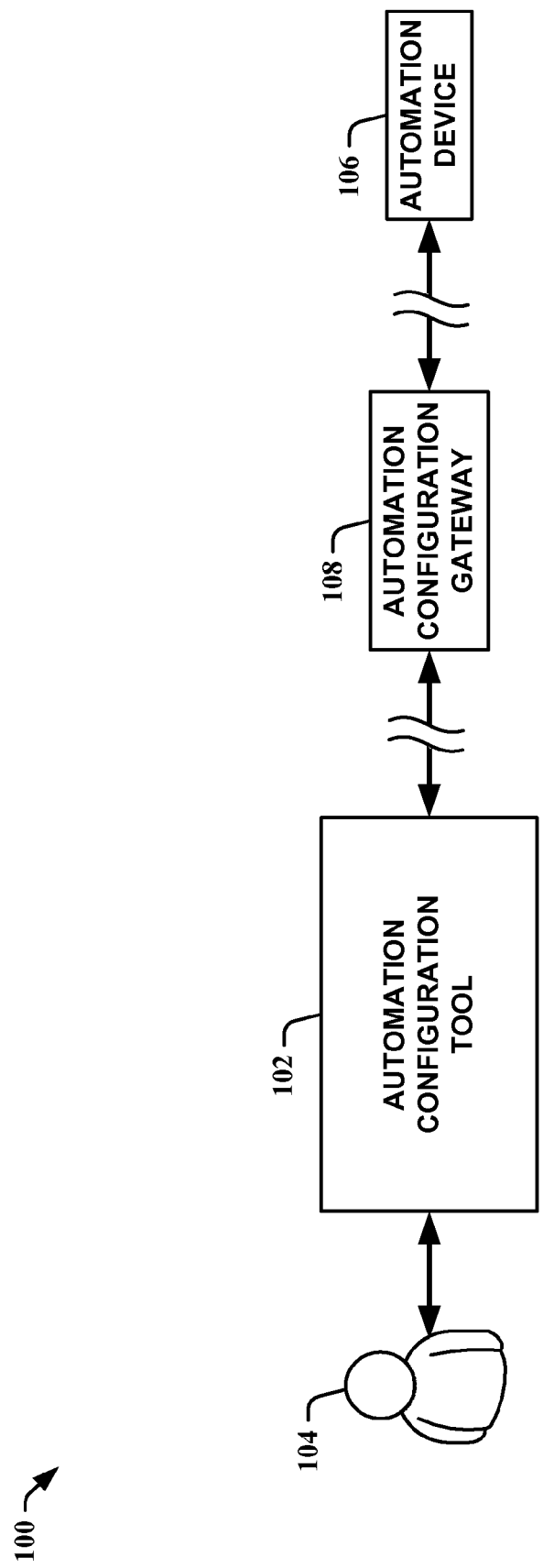
FIG. 1 is a block diagram of an automation configuration tool in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Furthermore, the subject matter may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject matter.

Instances of an automation configuration tool are provided that can utilize, for example, standard personal computer (PC) systems to perform configuration of distributed automation systems without requiring additional software to be installed. Parameterization of the configuration device itself can occur automatically by retrieving data from an explorable automation network, saving substantial effort and time for an automation system integrator. The parametric data can be stored locally with an automation device, with a configuration gateway/server, and/or in a remote location accessible by the automation configuration tool. The automation configuration tool can also remotely configure automation devices via an automation configuration gateway.

FIG. 1 illustrates an instance 100 of an automation configuration tool 102 that interfaces with a user 104 and an automation device 106 via an automation configuration gateway 108. The automation configuration gateway 108 serves the automation configuration tool 102 and provides a communication link between the automation configuration tool 102 and the automation device 106. The automation configuration tool 102 is comprised of an automation configuration applet that is a self-contained software application that can run within a Web browser. Thus, the automation configuration tool 102 does not require an automation system integrator to load additional software on a computing device in order to utilize the automation configuration tool 102.

The configuration applet can employ, for example, Sun Microsystems Java™ code to perform configuration tasks within the Web browser. The automation configuration tool 102 can reside remotely to the automation configuration gateway 108 and/or the automation device 106. The automation configuration tool 102 can configure and/or monitor multiple devices via the automation configuration gateway 108. Communications between the automation configuration tool 102, the automation configuration gateway 108, and the automation device 106 can be a local area network (LAN) and/or a wide area network (WAN), the Internet and/or an intranet, and/or other wired and/or wireless communications and the like.

Figure 2:
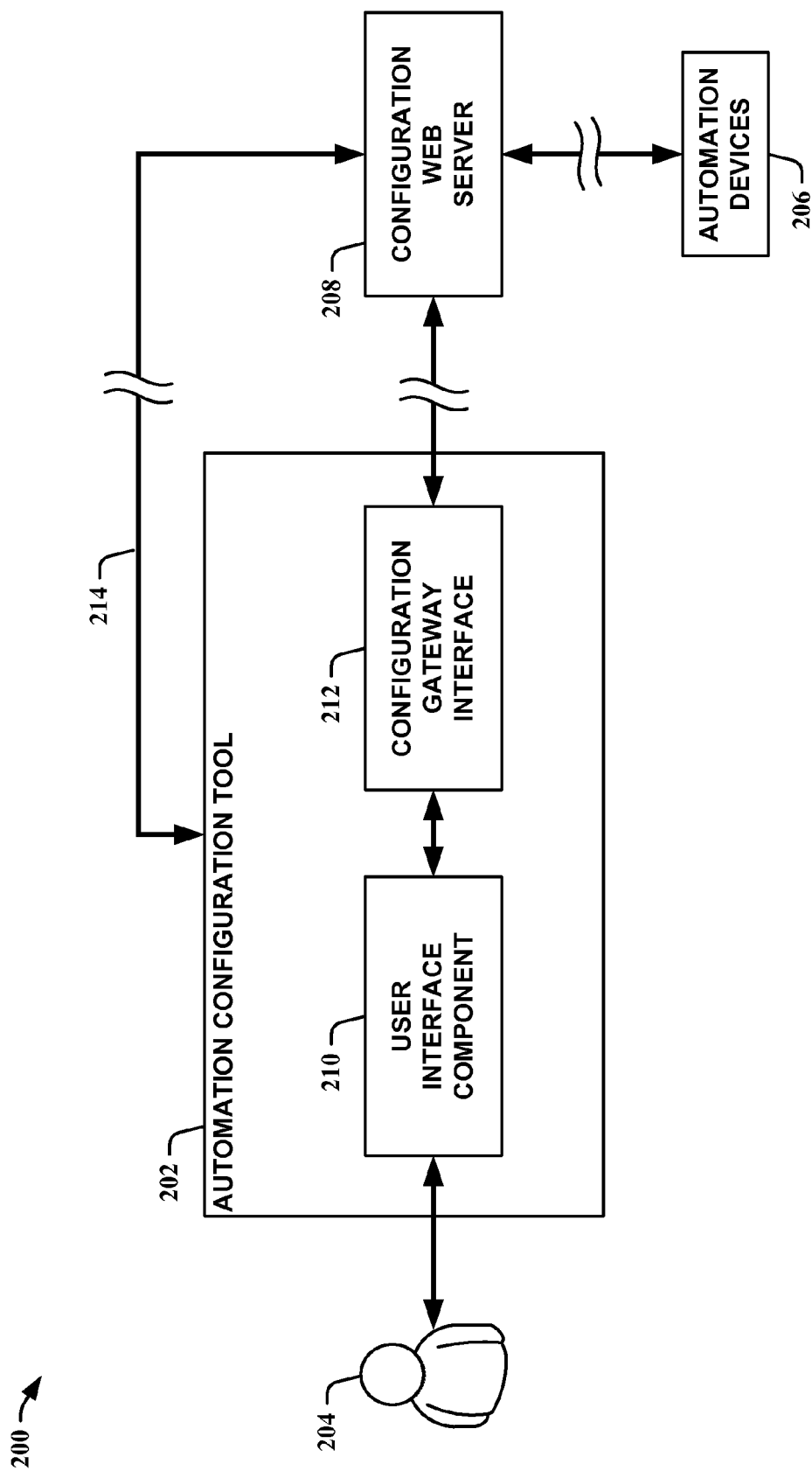
FIG. 2 is another block diagram of an automation configuration tool in accordance with an aspect of an embodiment.

Another instance 200 of an automation configuration tool 202 is shown in FIG. 2. The automation configuration tool 202 interfaces with a user 204 and automation devices 206 via an automation configuration web server 208. The automation configuration tool 202 utilizes a user interface component 210 and a configuration gateway interface 212. The configuration gateway interface 212 establishes communications with a configuration gateway hosted by the configuration web server 208 to allow communications between the user interface component 210 and the automation devices 206. The user interface component 210 displays data, controls, configuration parameters, and/or other parameters to the user 204. The displayed information can be influenced/guided by the automation devices 206 themselves. The automation configuration tool 202 is served up by the configuration web server 208 (denoted by line 214).

The initiation of the automation configuration tool 202 is typically accomplished via a web browser with web page information served by the configuration web server 208. This allows the user 204 to select the automation configuration tool 202 for use via a web browser. The configuration web server 208 typically provides a separate instantiation of a configuration gateway for each instantiation of the automation configuration tool 202. This allows multiple automation configuration tools to operate independently of each other to interact with automation devices 206. Communications between the automation configuration tool 202, the automation configuration gateway 208, and the automation device 206 can be a local area network (LAN) and/or a wide area network (WAN), the Internet and/or an intranet, and/or other wired and/or wireless communications and the like.

The above tools can also be utilized in standard-based systems such as, for example, IEC 61499 compliant automation systems. Thus, for illustration purposes, the following example is based on integration of an instance of an automation configuration tool disclosed herein in an IEC 61499 based environment. The automation configuration tool can display various types of parameters and offer possibilities to change them appropriately for each system. These parameters can be displayed in a general way, i.e., by the use of editable text fields, which display the value. The device itself can choose an appropriate appearance from a library of possible human-machine interface (HMI) IEC 61499 function blocks, which can be provided by, for example, a function block runtime environment (FBRT) (developed by James H. Christensen) for display purposes. To select specific parameters of function blocks, a configuration marker function block can be utilized. This function block can also contain information about a preferred appearance of a parameter. The configuration marker is described in further detail infra.

Figure 3:
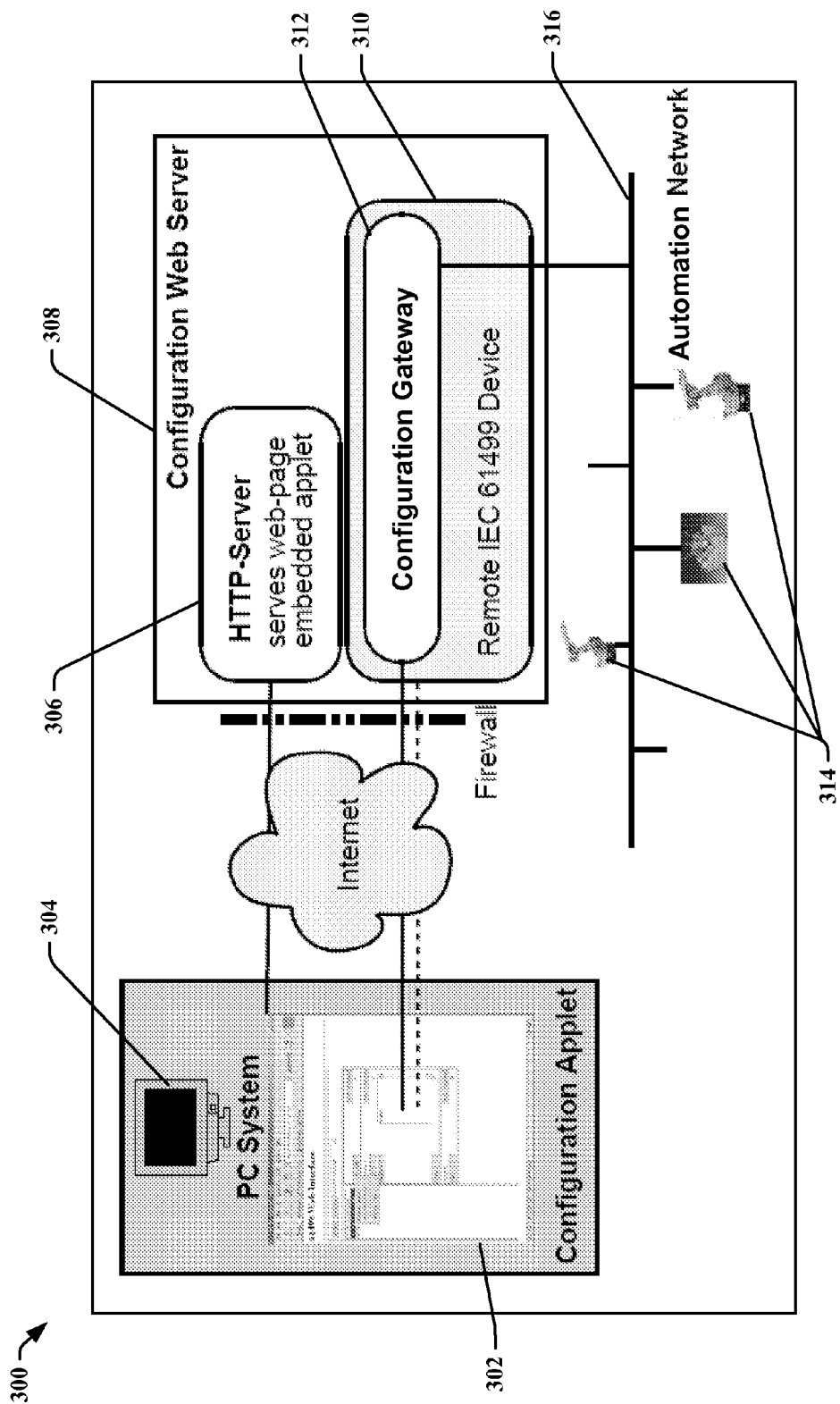
FIG. 3 is an illustration of a configuration tool interacting with a configuration web-server in accordance with an aspect of an embodiment.

An example structure 300 is illustrated in FIG. 3. An automation configuration tool, in this example, is a configuration applet 302 that runs on a PC system 304. The configuration applet 302 is based on a Java coded applet that is included in an HTML web-page served by an HTTP-server 306 that is part of a configuration web server 308. The configuration web server 308 is also used to execute an IEC 61499 remote device 310, which can be accessed by the configuration applet 302 via, for example, a TCP/IP connection. Management commands sent from the configuration applet 302 to the remote device 310 cause it to instantiate an automation configuration gateway 312. The configuration applet 302 disconnects from the remote device 310 to build a new connection to the freshly created automation configuration gateway 312.

This gateway 312 provides the interface to forward, for example, extensible markup language (XML) commands from the configuration applet 302 to the device 310, which is configured, for example, via TCP/IP connections. It also includes the network exploration application to inform the configuration applet 302 about present devices 314 on an automation network 316. The configuration applet 302 and/or the automation configuration gateway 312 can be constructed according to IEC 61499 function block structures. Multiple configuration access can be established because each configuration applet can create its own automation configuration gateway instance to access an automation system. Thus, instances disclosed herein provide platform-independent configuration tools that are available without the need of additional program installations on hosted computing devices.

Figure 4:
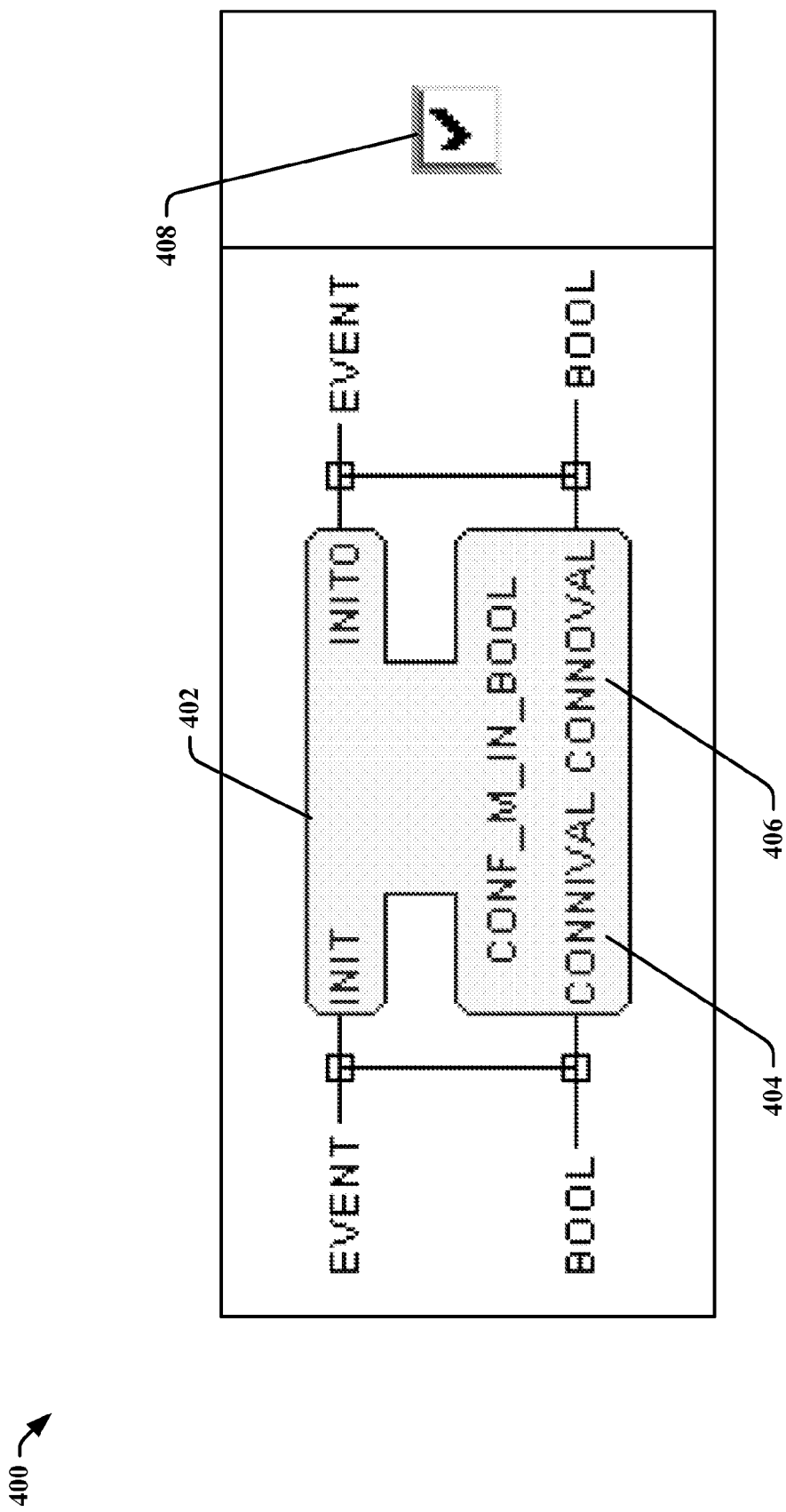
FIG. 4 is an illustration of a configuration marker for a Boolean parameter and its graphical representation in accordance with an aspect of an embodiment.

To allow automation devices to assist with the displaying and/or configuring of parameters associated with the devices, a configuration marker can be utilized. A configuration marker function block can be used to mark data and event inputs of selected function blocks and, by a differentiated type structure of the marker function blocks, to define the appearance of the configurable data input. For example, function blocks which are designated as a special type are considered as configurable. The type name of these function blocks can begin with, for example, a "CONF_M" string and their structure as illustration 400 depicts in FIG. 4. FIG. 4 also illustrates a graphical representation 408 of the configuration marker for a Boolean parameter. The graphical representation 408 can also be constructed of other graphical user interface (GUI) elements such as knob, sliders, and/or pointers and the like, depending on the type of data. A service interface function block 402 performs a mapping of the data input value 404 (CONNIVAL) to the data output 406 (CONNOVAL), which is connected to a specific data input, which is configurable. The remaining string of the configuration marker's type name can be utilized to define the appearance of a configuration parameter. Thus, this string can refer to an HMI function block of the FBRT library, which selects it for display.

Figure 5:
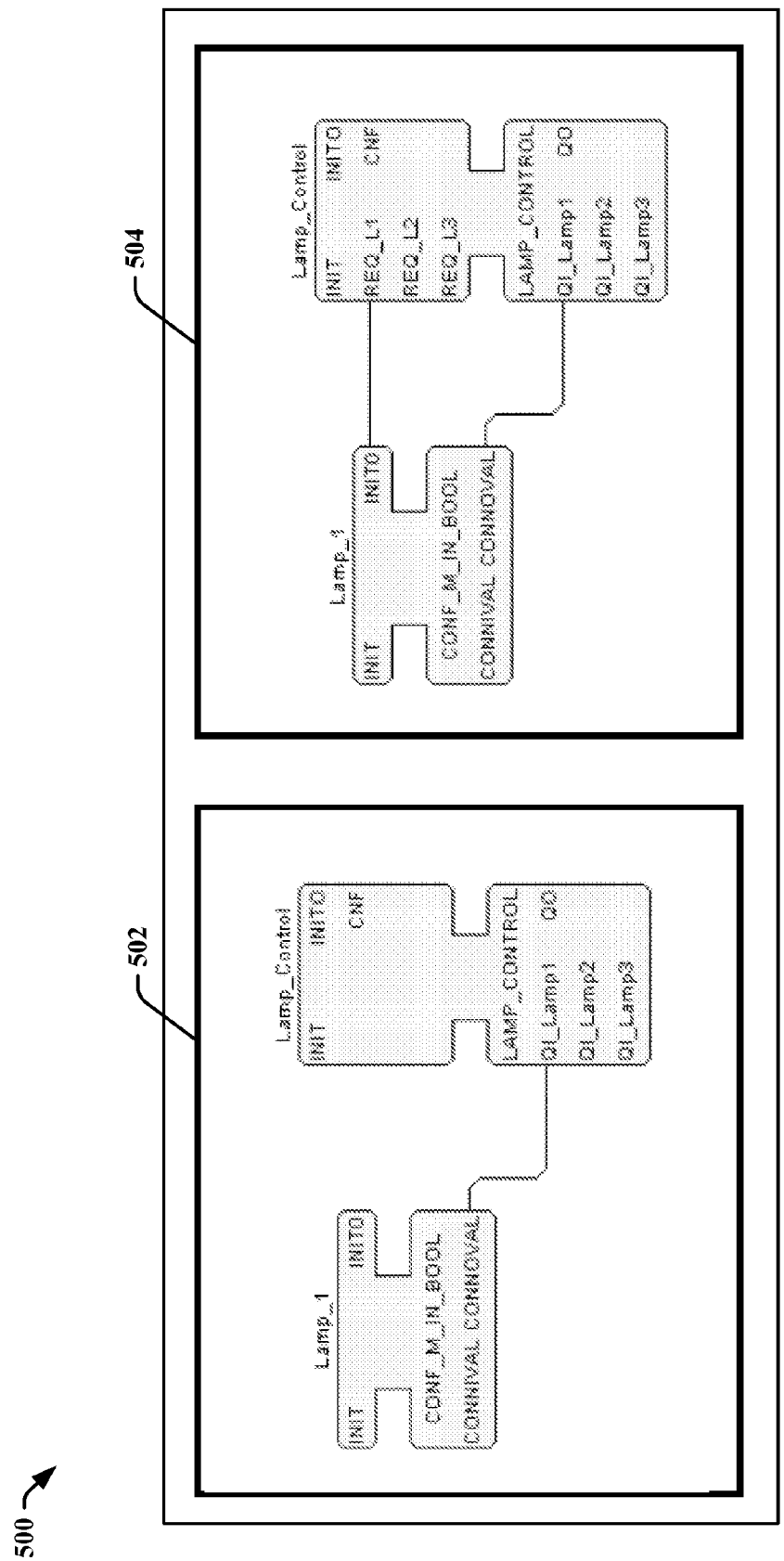
FIG. 5 is an illustration of a configuration marker with and without autonomous event creation in accordance with an aspect of an embodiment.

A function block supporting the configuration marker can process a changed value in several ways. One way is to connect the data output CONNOVAL of the configuration marker function block to this function block as shown in the left part 502 (without autonomous event creation on parameter change) of the illustration 500 of FIG. 5. The value is then processed every time the algorithm of the function block needs it. Another way is to connect the data and the event output of the configuration marker function block to this function block according to the right part 504 (with autonomous event creation on parameter change) of FIG. 5. Each time a user downloads values from a configuration applet to a resource the configuration marker function blocks are restarted. The resulting event can be used to notify a connected function block that a possible change of a parameter value could have occurred.

Figure 6:
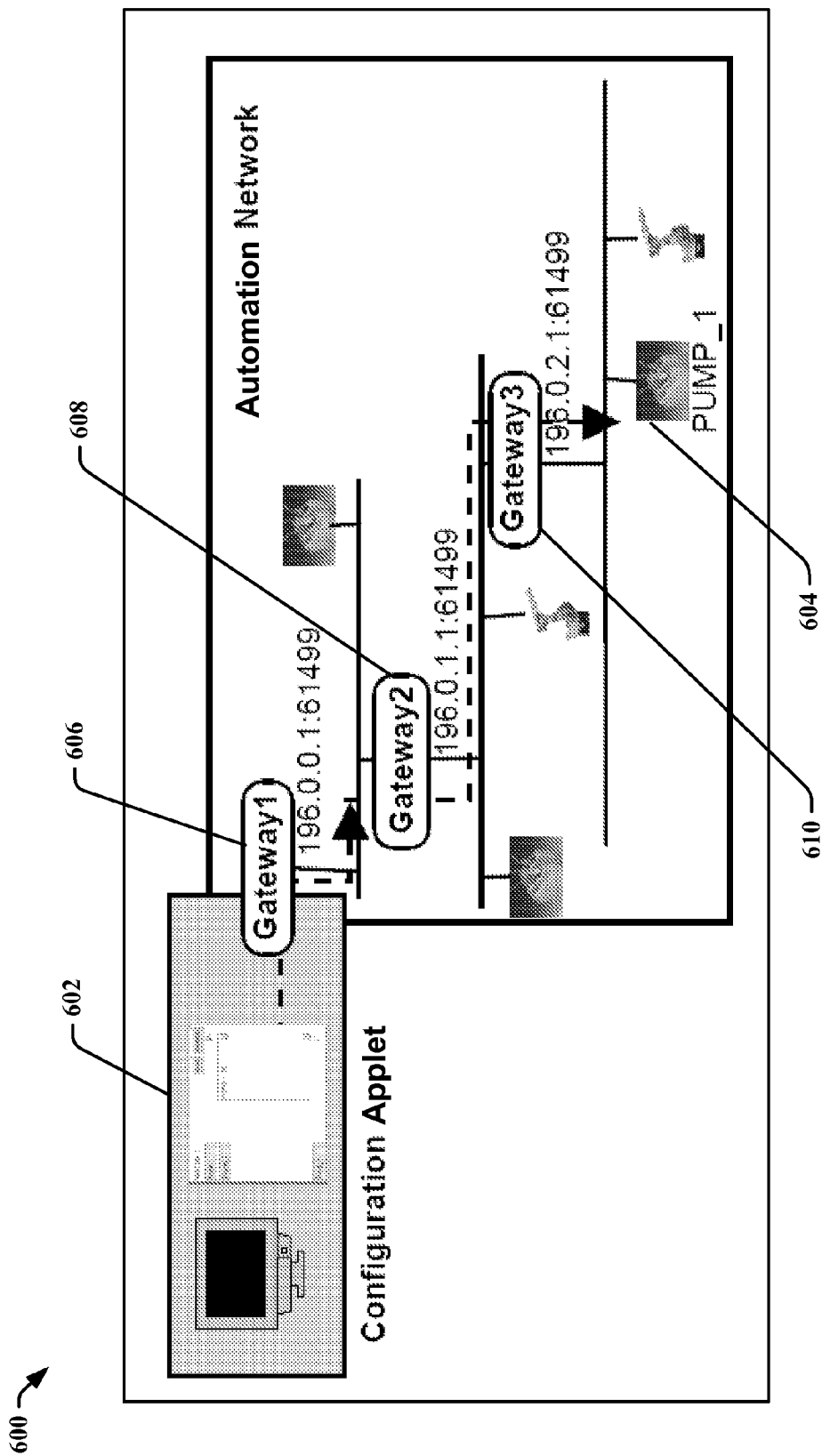
FIG. 6 is an illustration of a configuration tool navigating through a hierarchical structure of configuration gateways in accordance with an aspect of an embodiment.

Instances of automation configuration tools disclosed herein can also be utilized to access automation devices via multiple gateways. A configuration applet 602 shown in an illustration 600 of FIG. 6 can access automation device 604 by navigating through gateway 1 606, gateway 2 608, and gateway 3 610 for example. This substantially increases the flexibility of the configuration applet 602 and increases its configuration capabilities by extending its reach to multiple automation networks. Selection of various gateways and/or automation devices via a configuration tool is described in further detail infra.

The configuration tool (or applet) represents an HMI which allows access to automation networks by the use of the previously described gateways. To enable a user to fulfill their configuration tasks comfortably and reliably, instances of configuration tools disclosed herein can include several functions such as, for example, configuration gateway initiation and/or connection, listing of automation network devices, and/or detailed device exploration and parameterization and the like. A configuration applet can be based on a modular structure to enable easy implementation of these functions into other applications and/or to extend the provided functionality with new ones.

Figure 7:
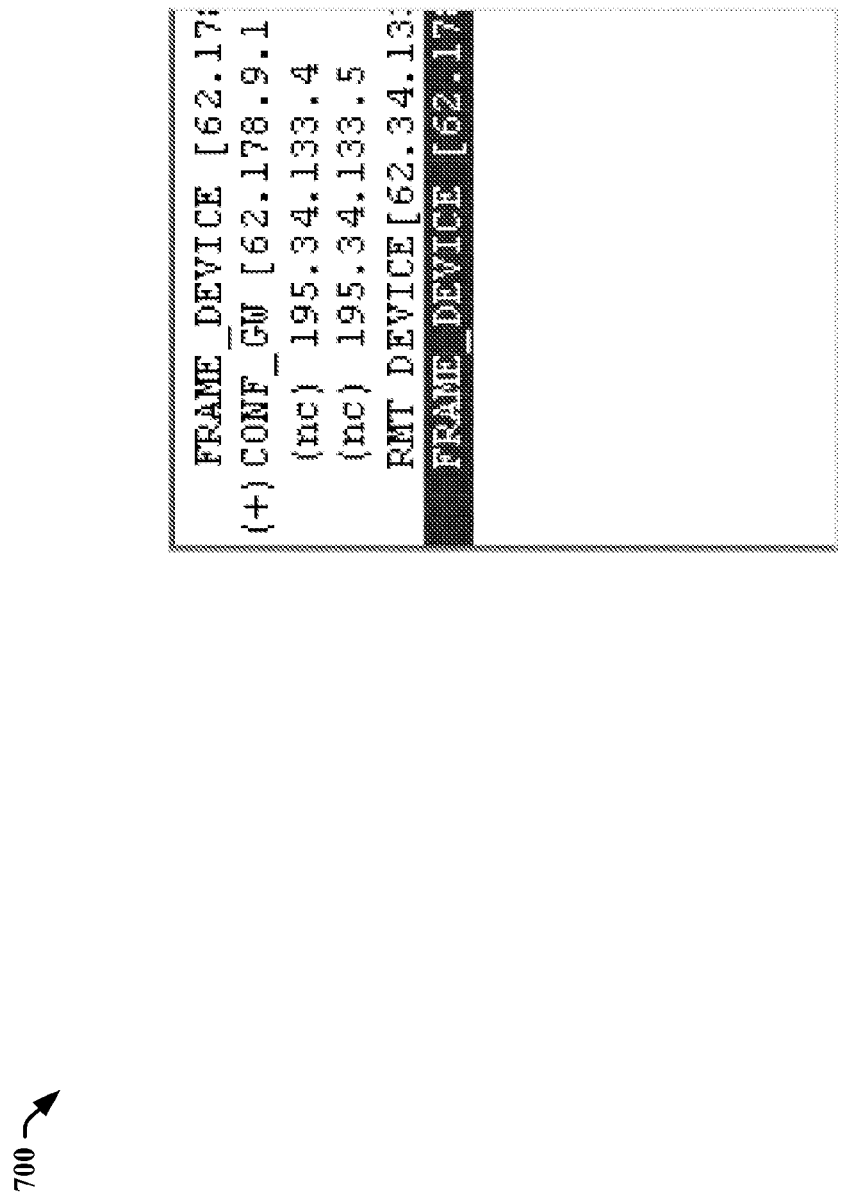
FIG. 7 is an illustration of a configuration tool parameter display for an automation device along with its resources in accordance with an aspect of an embodiment.

For gateway connections, a user can decide when they want to connect to an automation network and receive feedback if their connection attempt is successful or not. An established connection allows additional functions to occur, such as the listing of automation network devices. A configuration gateway sends a list of device identifiers from detected automation devices on request by a configuration applet. The list could include IDs of standard-compliant devices (e.g. IEC 61499 compliant devices) and non-compliant ones. The non-compliant devices typically cannot be configured and, therefore, often need to be specially marked. Thus, the displayed list can consist of standard conforming and non-conforming devices and can even include additional information about them. For example, a name of a device, if available, can give information about the type of tasks it fulfills. This eases the orientation in the automation device list. The list can also be further enhanced by using, for example, a prefixed plus character ("+") to identify devices which are configuration gateways. A user can also choose to list devices which are in an adjacent network and the like. Thus, the resulting display can be organized in a "tree-structure," as shown in an illustration 700 in FIG. 7 (a parameter display of a device and its resources). As a further example, a prefixed "(nc)" string can indicate that the device is not conforming to a standard and is therefore not explorable (see FIG. 7).

Figure 8:
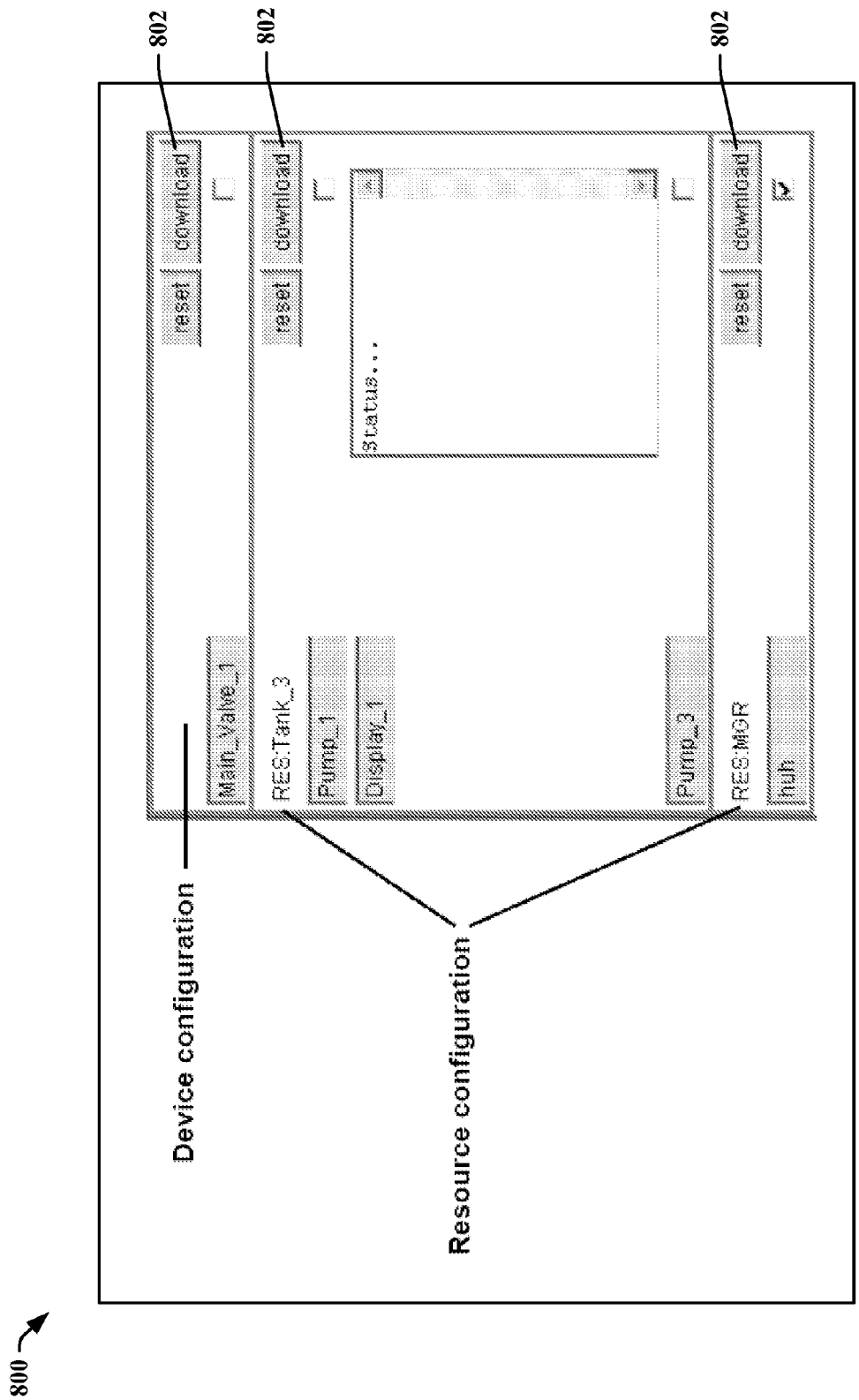
FIG. 8 is another illustration of a configuration tool parameter display for an automation device along with its resources in accordance with an aspect of an embodiment.

An automation device can be selected from a list and explored in more detail, which can result in a display of some or all configurable parameters it provides. These parameters can be recognized, for example, by means of a configuration marker function block, which stores the name and the type of the configurable parameter. Its appearance can be defined by the type of the configuration marker, which the developer of the device can define, because each configuration marker type can refer to an HMI function block in a class library of an FBRT. Parameters can be listed in order of the resources they are included in as shown in an illustration 800 in FIG. 8. For example, parameters responsible for direct automation device configuration can be listed first, followed by the parameters embedded into the resources.

HMI function blocks that are responsible for an appropriate display of configuration parameters can also be utilized to change a value according to the user's needs. The download of the new parameter values to an automation device can be accomplished for a whole resource by, for example, pressing an appropriate "download" button 802 (see FIG. 8) and/or some other similar control and the like. To inform the user reliably if their changes were completed successfully, the parameter values of this resource are queried again and displayed. Errors that occurred while attempting to display or download parameters and values can be displayed directly next to a parameter. HMI function blocks like check-boxes, slide-bars, choice and text fields, and/or buttons and the like can be utilized for displaying parameters and/or configuration controls. It is possible to develop new types of HMI input components and add them to an HMI class library.

Figure 9:
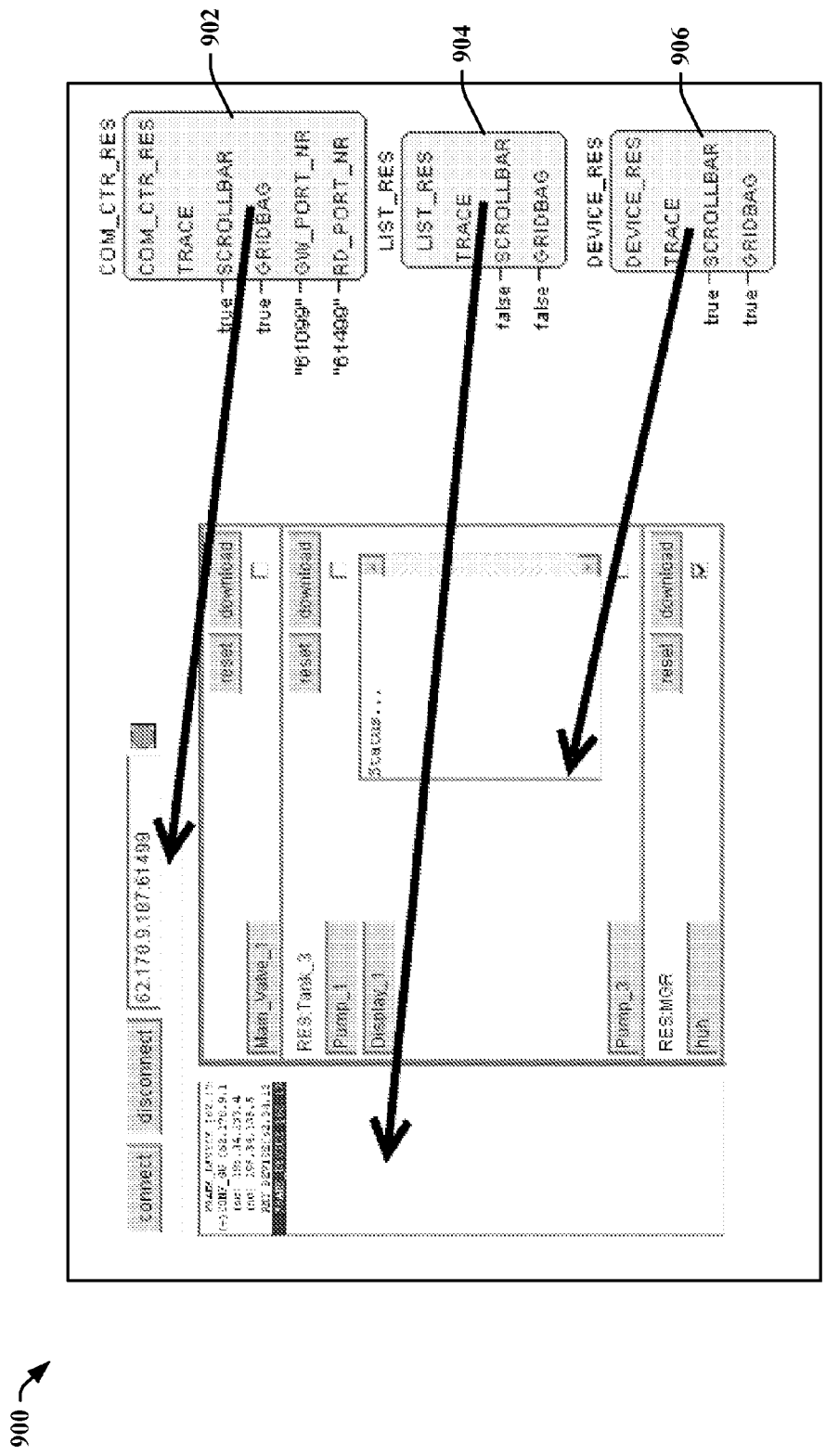
FIG. 9 is an illustration of configuration tool resources and their corresponding graphical and textual displays in accordance with an aspect of an embodiment.

FIG. 9 is an illustration of an example HMI 900 for a configuration tool disclosed herein. Various function blocks 902-906 are utilized to display communication parameters, device lists, and display parameters. For example, a communication control function block 902 can be utilized to construct and release connections to a configuration gateway and/or provide an interface to the configuration gateway for other resources. It connects to a remote device on a configuration web server from which a configuration applet is served and instantiates a configuration gateway on this device. When this is achieved, it can disconnect from the remote device and connect to the generated configuration gateway. A device list function block 904 can be utilized to display detected automation devices of a configurable automation network and/or to permit a user to interact with them. A device display function block 906 can be utilized to construct detailed configuration views of selected automation devices, to display configurable parameters, and/or to manipulate the configurable parameters and the like.

Figure 10:
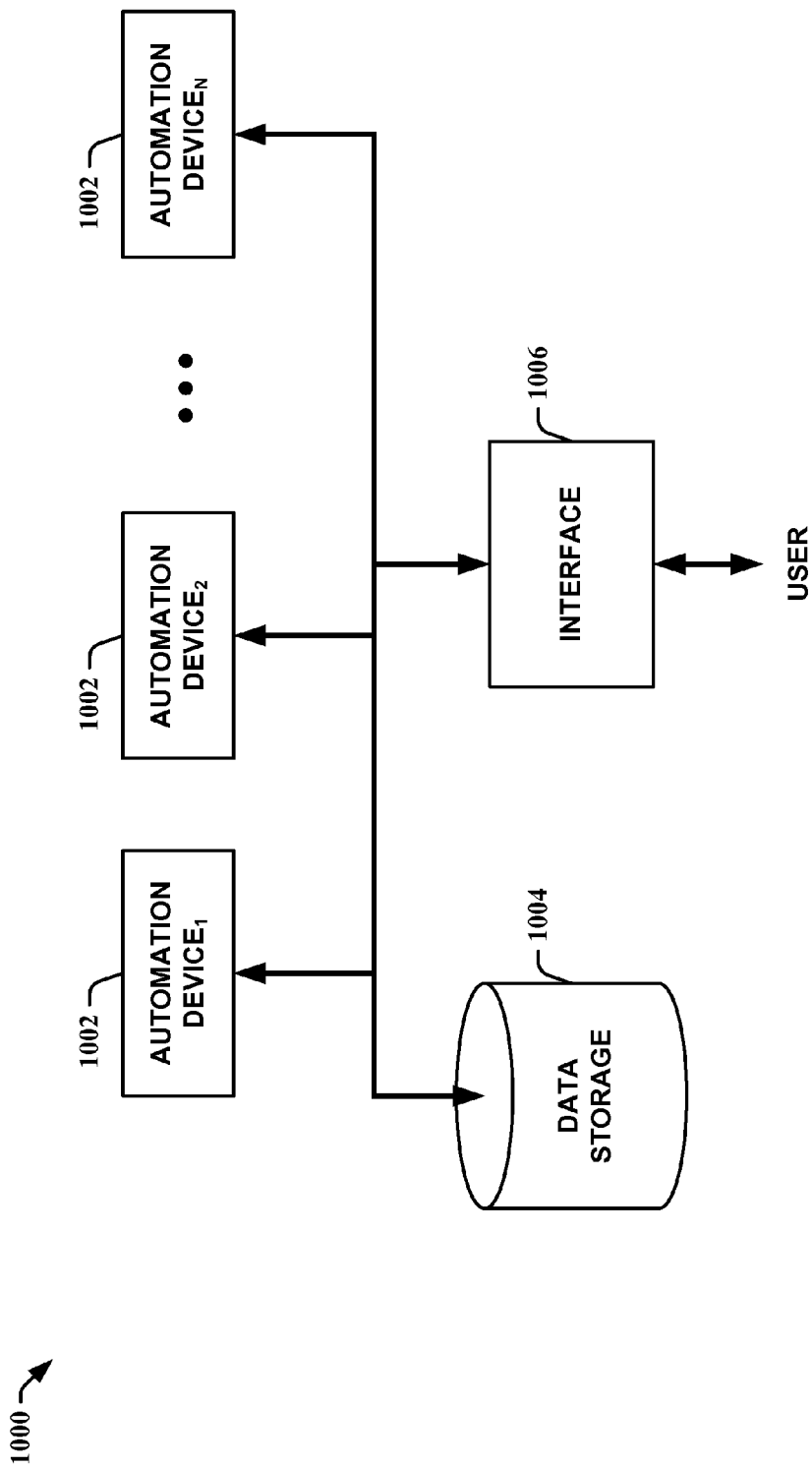
FIG. 10 is a block diagram of an automation system in accordance with an aspect of an embodiment.

The above configuration tools and systems are utilized to configure automation systems. FIG. 10 illustrates a typical automation system 1000 for reference. The automation system 1000 is comprised of one or more automation device(s) 1002 (AUTOMATION DEVICE$_1$ through AUTOMATION DEVICE$_N$, where N is an integer from one to infinity), data storage 1004 and interface 1006. Automation device(s) 1002 can include any one of a plurality of industrial, commercial and/or entertainment processes and machines such as programmable logic controllers (PLCs), pumps providing fluid transport and other processes, fans, conveyor systems, compressors, gear boxes, motion control and detection devices, sensors, screw pumps, and mixers, as well as hydraulic and pneumatic machines driven by motors. Such motors can be combined with other components, such as valves, pumps, furnaces, heaters, chillers, conveyor rollers, fans, compressors, gearboxes, and the like, as well as with appropriate motor drives to form industrial machines and actuators. For example, an electric motor could be combined with a motor drive providing variable electrical power to the motor, as well as with a pump, whereby the motor rotates the pump shaft to create a controllable pumping system.

Data storage 1004 provides a storage location for housing data relating to automation device(s) 1002 including but not limited to device description, location, and mechanical condition, energy or fuel consumption, completed cycles, horsepower, average RPM, efficiency rating, as well as data from sensors regarding device health and/or performance. The data storage 1004 can be integrated or federated and linked by a communication system. Interface 1006 is operable to connect users with a network of automation devices 1002 and/or data storage 1004 via a wire (e.g., twisted pair, coaxial cable, optical fiber, Ethernet, USB (Universal Serial Bus), FireWire) or wirelessly (e.g., using IEEE 802.11a and/or IEEE 802.11b standards, Bluetooth technology, satellite). Interface 1006 facilitates monitoring, extracting, transmitting, and otherwise interacting with automation device(s) 1002 and associated data.

As shown in FIG. 10, a user such as, for example, a device operator can connect to data storage 1004 and automation devices 1002 over a local area network (LAN) utilizing a variety of LAN technologies, including Fiber Distributed Data Interface (FDDI), Copper Distributed Data Interface (CDDI), Ethernet/IEEE 802.3, Token Ring/IEEE 802.5, physical connection topologies such as bus, tree, ring, and star, and the like. However, communications between networked devices such as automation devices 1002, data storage 1004, and interface 1006 need not be limited to those devices connected locally to a network. Local networked devices can also communicate to and from remote devices.

Figure 11:
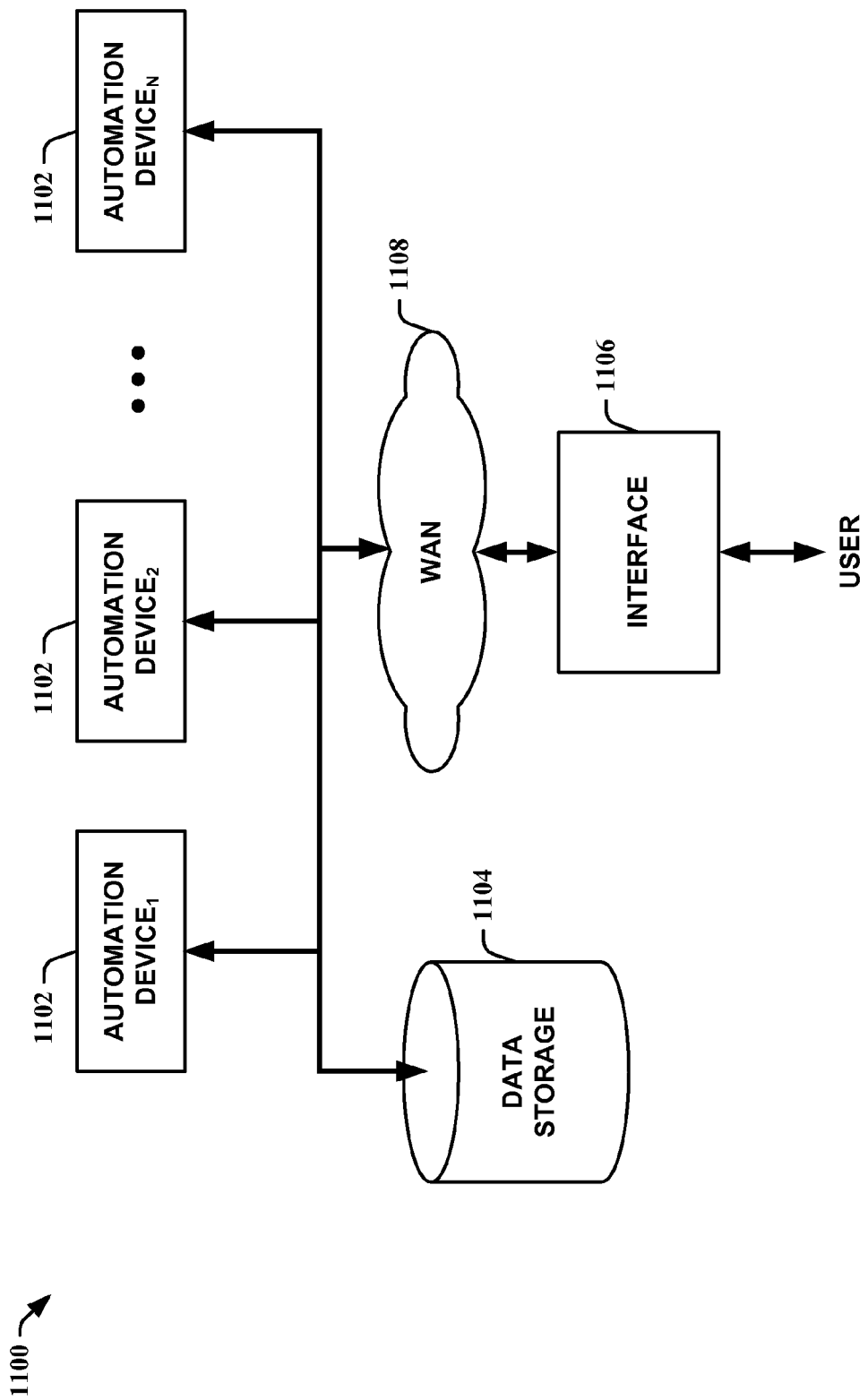
FIG. 11 is another block diagram of an automation system in accordance with an aspect of an embodiment.

FIG. 11 is substantially the same as system 1000 except that a user employs interface 1106 to interact with automation devices 1102 and data storage 1104 remotely over a wide area network (WAN) 1108. WANs 1108 are communication networks that span a large geographic area (e.g., nationwide, worldwide) and generally consist of the several interconnected local area networks (LANs) and metropolitan area networks (MANs). The largest WAN 1108 in existence today is the Internet. WAN technologies include, but are not limited to, point-to-point links, circuit switching networks like Integrated Services Digital Networks (ISDN) and variations thereon, packet switching networks, TI networks, and Digital Subscriber Lines (DSL).

Figure 12:
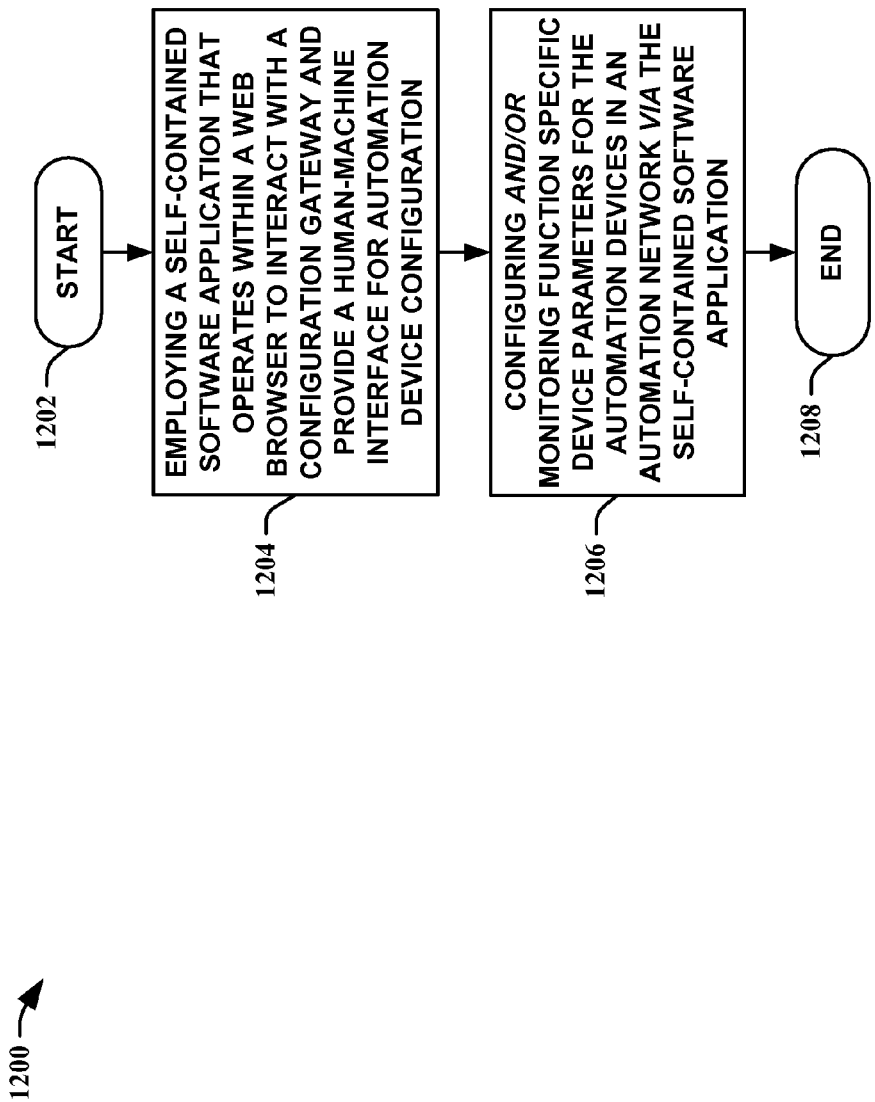
FIG. 12 is a flow diagram of a method of configuring automation control systems in accordance with an aspect of an embodiment.
Figure 13:
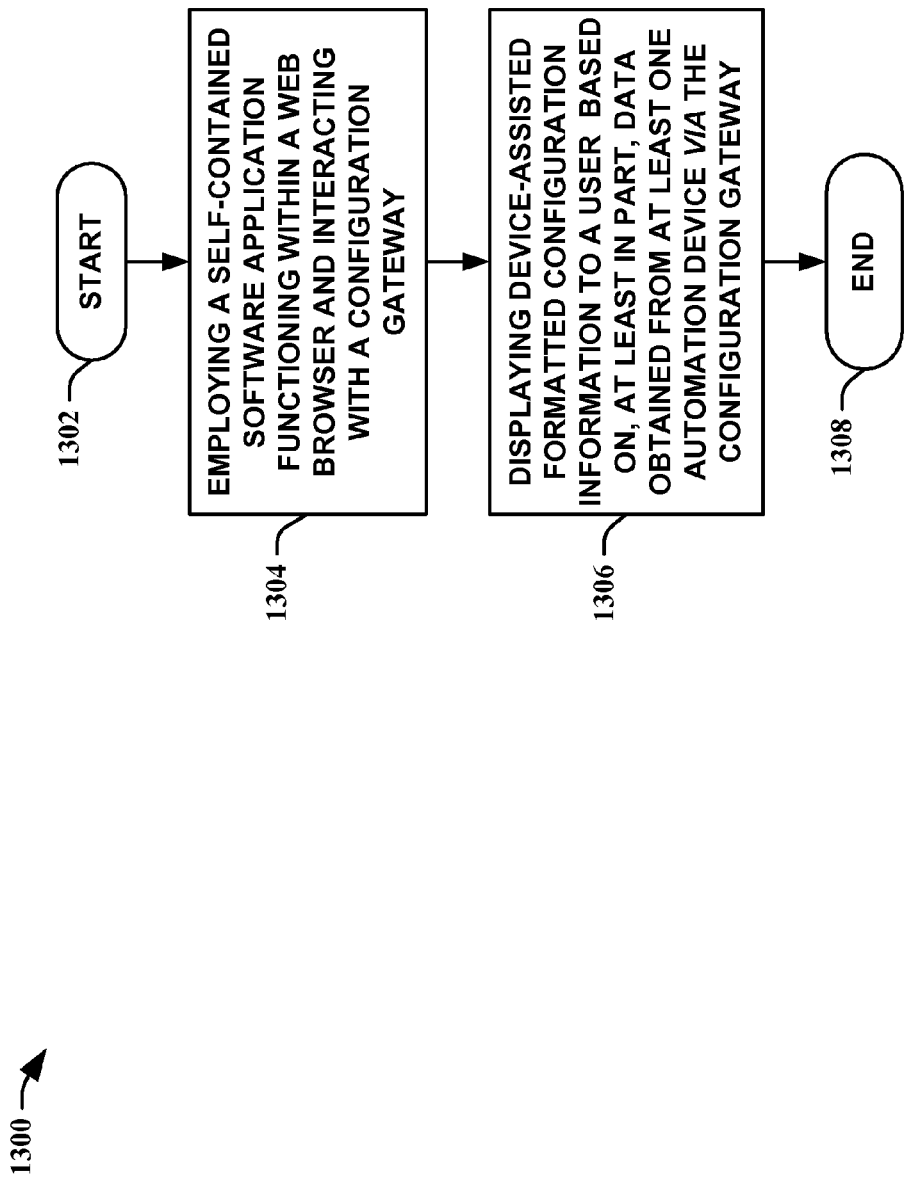
FIG. 13 is another flow diagram of a method of configuring automation control systems in accordance with an aspect of an embodiment.

In view of the exemplary systems shown and described above, methodologies that may be implemented in accordance with the embodiments will be better appreciated with reference to the flow charts of FIGS. 12-13. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

In FIG. 12, a flow diagram of a method 1200 of configuring automation control systems in accordance with an aspect of an embodiment is shown. The method 1200 starts 1202 by employing a self-contained software application that operates within a web browser to interact with a configuration gateway and provide a human-machine interface for automation device configuration 1204. In some instances the self-contained software application is served up by a configuration web server along with an HTML web page. The configuration web server can also provide the configuration gateway that the self-contained software application interacts with. The self-contained software application can included, but is not limited to, a configuration applet based on Sun Microsystems Java™ code and the like.

By utilizing self-contained software applications, an automation system engineer is not required to load additional software on a computing device just to configure automation devices. The engineer can configure automation devices in a remote fashion by initiating a web page served by the configuration web server and initiating the self-contained software application. Function specific device parameters for the automation devices in an automation network are then configured and/or monitored via the self-contained software application 1206, ending the flow 1208. The parameters are typically obtained from remote locations via one or more configuration gateways. The flexibility of utilizing multiple gateways allows the self-contained software application to communication with multiple automation networks and their devices.

Looking at FIG. 13, another flow diagram of a method 1300 of configuring automation control systems in accordance with an aspect of an embodiment is depicted. The method 1300 starts 1302 by employing a self-contained software application functioning within a web browser and interacting with a configuration gateway 1304. The self-contained software application can included, but is not limited to, a configuration applet based on Sun Microsystems Java™ code and the like. Device-assisted formatted configuration information is then displayed to a user based on, at least in part, data obtained from at least one automation device via the configuration gateway 1306, ending the flow 1308.

The self-contained software application can display configurable parameters utilizing provided information. The provided information can originate directly from an automation device and/or from another source such as, for example, a configuration web server and the like, including from the configuration gateway. The storing of the configuration data can reside in other locations accessible by the self-contained software application as well. Some instances, such as IEC 61499 compliant devices can employ a configuration marker to facilitate in determining how parameters should be displayed and what aspects can be configured and the like.

Figure 14:
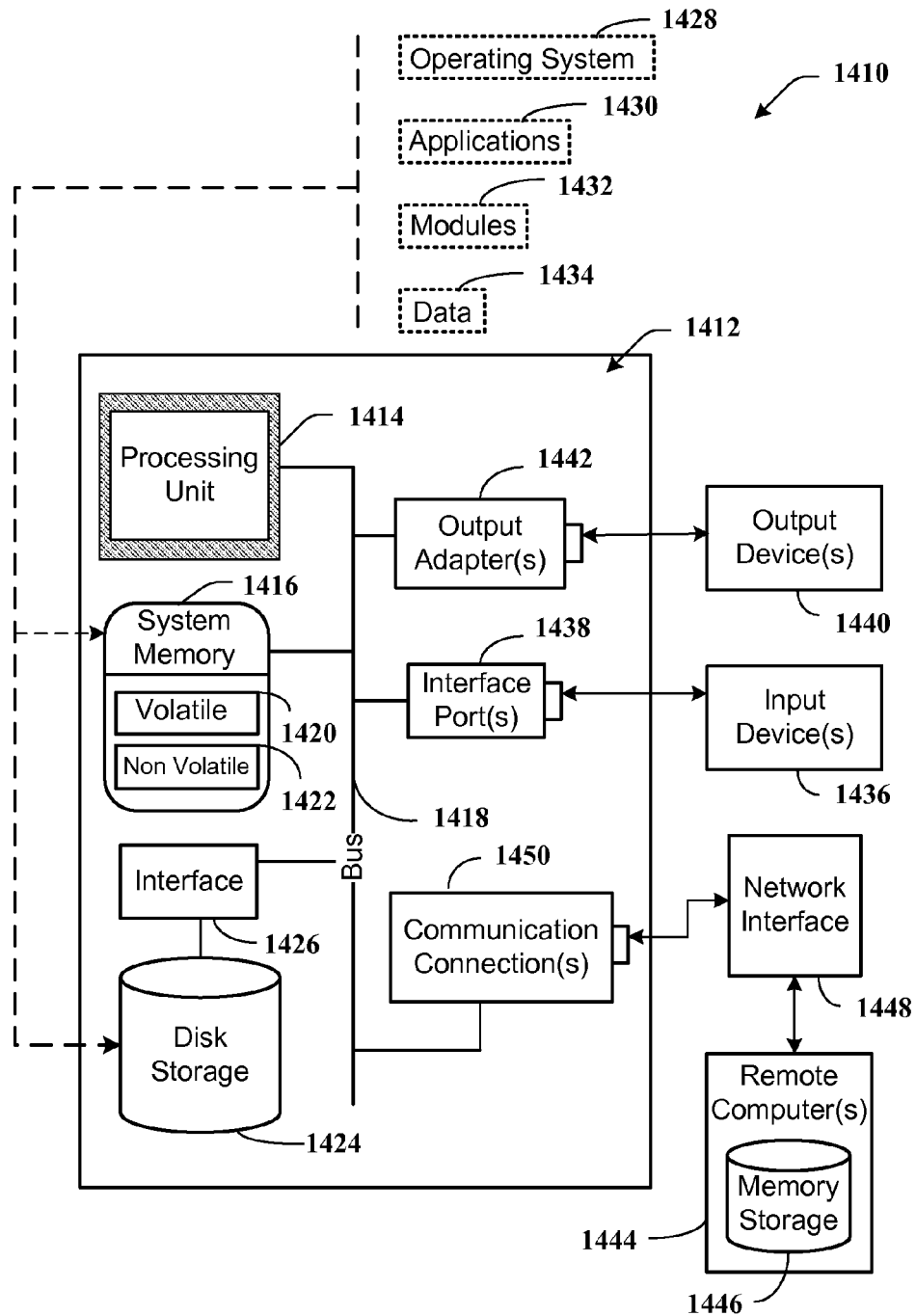
FIG. 14 illustrates an example operating environment in which an embodiment can function.

In order to provide additional context for implementing various aspects of the embodiments, FIG. 14 and the following discussion is intended to provide a brief, general description of a suitable computing environment 1400 in which the various aspects of the embodiments can be implemented. While the embodiments have been described above in the general context of computer-executable instructions of a computer program that runs on a local computer and/or remote computer, those skilled in the art will recognize that the embodiments can also be implemented in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, handheld computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and a computer. By way of illustration, an application running on a server and/or the server can be a component. In addition, a component can include one or more subcomponents.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416, to the processing unit 1414. The processing unit 1414 can be any of various available processors. Dual microprocessors and other multi-processor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
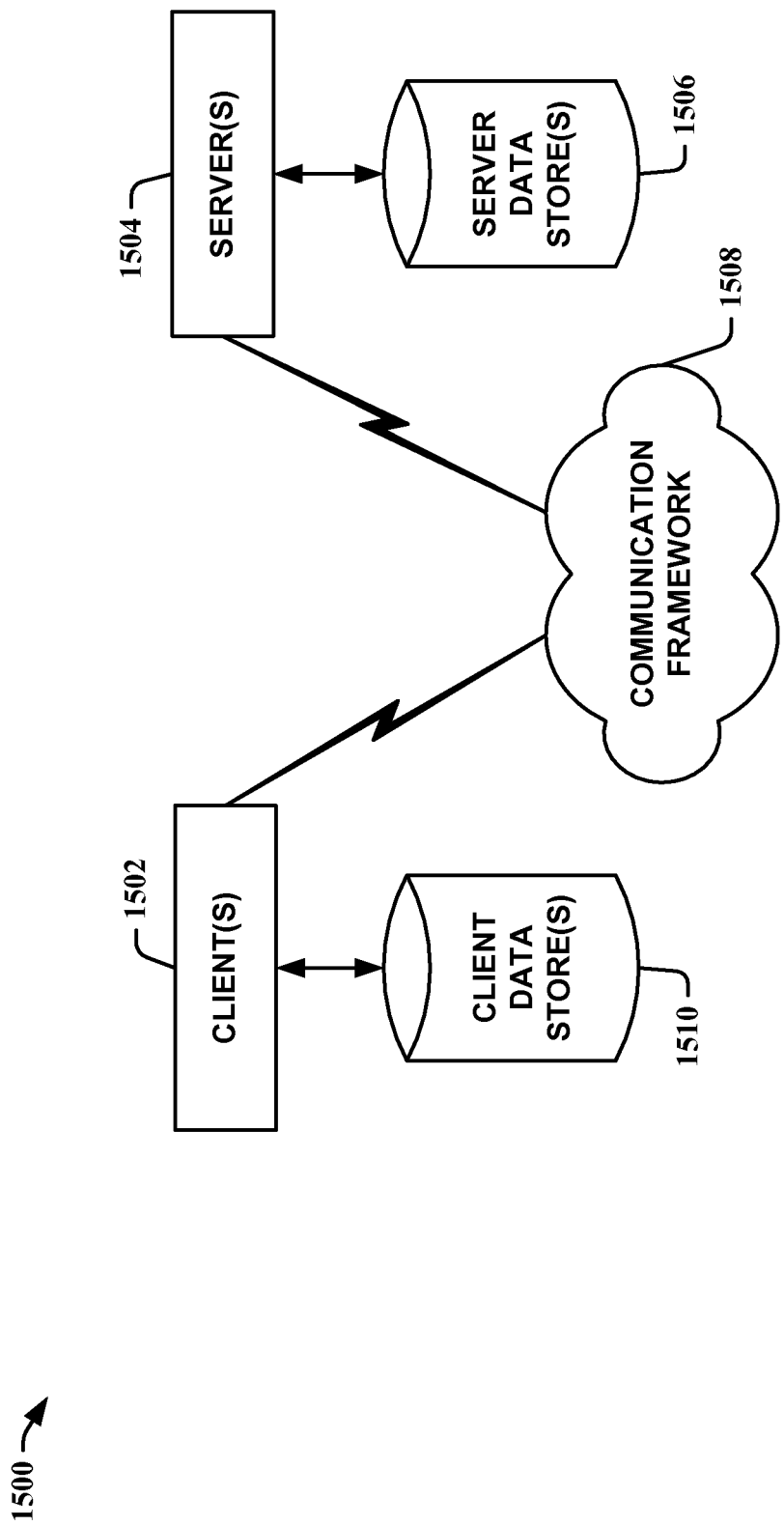
FIG. 15 illustrates another example operating environment in which an embodiment can function.

FIG. 15 is another block diagram of a sample computing environment 1500 with which embodiments can interact. The system 1500 further illustrates a system that includes one or more client(s) 1502. The client(s) 1502 can be hardware and/or software (e.g., threads, processes, computing devices). The system 1500 also includes one or more server(s) 1504. The server(s) 1504 can also be hardware and/or software (e.g., threads, processes, computing devices). One possible communication between a client 1502 and a server 1504 can be in the form of a data packet adapted to be transmitted between two or more computer processes. The system 1500 includes a communication framework 1508 that can be employed to facilitate communications between the client(s) 1502 and the server(s) 1504. The client(s) 1502 are connected to one or more client data store(s) 1510 that can be employed to store information local to the client(s) 1502. Similarly, the server(s) 1504 are connected to one or more server data store(s) 1506 that can be employed to store information local to the server(s) 1504.

In one instance of an embodiment, a data packet transmitted between two or more computer components that facilitates configuration of automation systems is comprised of, at least in part, information routed through a configuration gateway and relayed between a configuration applet running on a web browser and/or an automation device connected to an automation network.

It is to be appreciated that the systems and/or methods of the embodiments can be utilized in automation configuration tool facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automation configuration tool embodied on a non-transitory computer-readable medium, comprising:
    a software application configured to operate within a web browser and to provide remote access to an automation device in an automation network to change and monitor device parameters, comprising:
        a configuration interface configured to access a remote device executed by a web server, to submit a command to the remote device to instantiate a configuration gateway that acts as a link between the communication interface and the automation device, and to interact with a configuration gateway server to obtain configurable parameter information for the automation device; and
        an interface configured to display the configurable parameter information in a format defined by a human-machine interface (HMI) function block, wherein the automation device selects the HMI function block from an HMI function block library using a configuration marker that references the HMI function block.

2. The automation configuration tool of claim 1, wherein the software application is configured to accept multiple devices, information formatting, or data types.

3. The automation configuration tool of claim 1, wherein the automation configuration tool comprises an International Electrotechnical Commission (IEC) 61499 compliant configuration tool configured to interact with IEC 61499 compliant automation devices in the automation network.

4. The automation configuration tool of claim 1, wherein the automation configuration tool is location independent.

5. The automation configuration tool of claim 1, wherein the configuration interface is configured to facilitate navigation through multiple gateways to access automation devices in at least one different automation network.

6. The automation configuration tool of claim 1, wherein the configuration gateway is configured to provide a list of device identifiers corresponding to detected automation devices in response to a request from the software application.

7. A method for configuring an automation control system, comprising:
   employing a software application that operates within a web browser to connect to a remote device executed on a web server;
   sending a command from the software application to the remote device instructing the remote device to instantiate a configuration gateway on the web server, the gateway acting as a link to an automation device in an automation network;
   establishing a connection between the software application and the configuration gateway;
   interacting with a configuration gateway server to obtain information relating to a device parameter for the automation device via the connection between the software application and the configuration gateway, wherein the configuration gateway server stores device parameter data for the automation device; and
   displaying the device parameter in a display format selected by the automation device, wherein the automation device selects the display format using a configuration marker associated with the automation device that references a human-machine interface (HMI) function block stored in a library of function blocks that defines the display format of the device parameter.

8. The method of claim 7, further comprising extending functionality of the software application to allow multiple configurations, data types, or configuration control.

9. The method of claim 7, wherein the remote device is based on a standard for engineering platforms.

10. The method of claim 9, wherein the standard comprises an International Electrotechnical Commission (IEC) 61499 compatible standard.

11. The method of claim 7, further comprising:
    displaying, within the software application, a list of device identifiers corresponding to detected automation devices in the automation network based on information provided by the configuration gateway; and
    displaying a configurable parameter corresponding to a selected device identifier in response to selection of the selected device identifier from the list.

12. The method of claim 7, further comprising navigating multiple configuration gateways to access an automation device in another automation network.

13. The method of claim 7, further comprising:
    displaying the device parameter associated with the automation device using the software application; and
    modifying the device parameter based on input received via the browser using the software application.

14. The method of claim 7, wherein the software application is a Java applet.

15. A non-transitory computer-readable medium having stored thereon computer executable instructions that, in response to execution, cause a computer system to perform operations, comprising:
    accessing a web server from a self-contained software application operating within a web browser;
    sending a command from the software application to the web server instructing the web server to instantiate a configuration gateway that establishes a link to an automation device on an automation network;
    interacting with a configuration gateway server via the software application to access a device parameter for the automation device, wherein the configuration gateway server stores device parameter data for the automation device;
    configuring and monitoring the device parameter via the self-contained software application and the configuration gateway; and
    rendering the device parameter according to a display format determined by a human-machine interface (HMI) function block, wherein the automation device selects the HMI function block from a library of HMI function blocks based on a configuration marker associated with the automation device.

16. The non-transitory computer-readable medium of claim 15, further comprising:
    obtaining configuration format data from the automation device via the configuration gateway; and
    displaying the device parameter based, at least in part, on the configuration format data.

17. A device employing the method of claim 7 comprising at least one of a computer, a server, or a handheld electronic device.

* * * * *